Aug. 18, 1970     J. B. NICOL     3,524,547
APPARATUS FOR THE TREATMENT OF SEWAGE AND LIKE INDUSTRIAL WASTE
Filed Jan. 27, 1969     2 Sheets-Sheet 1
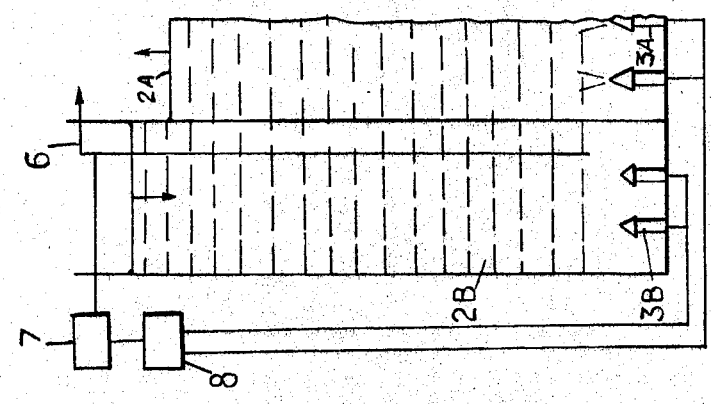
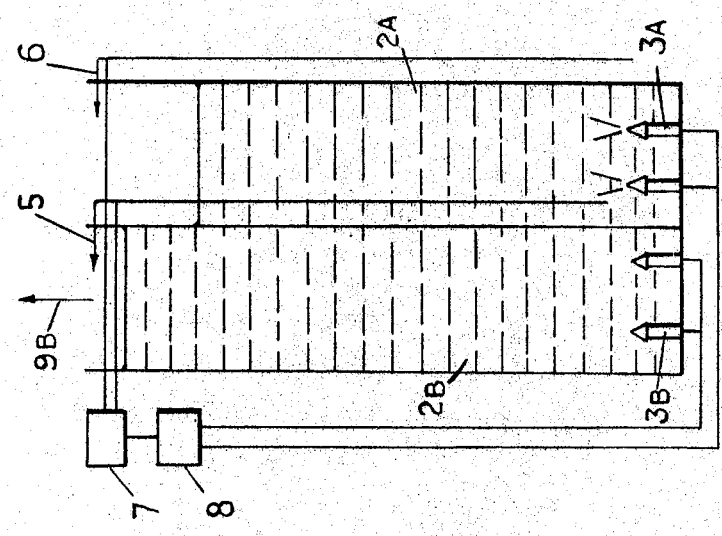
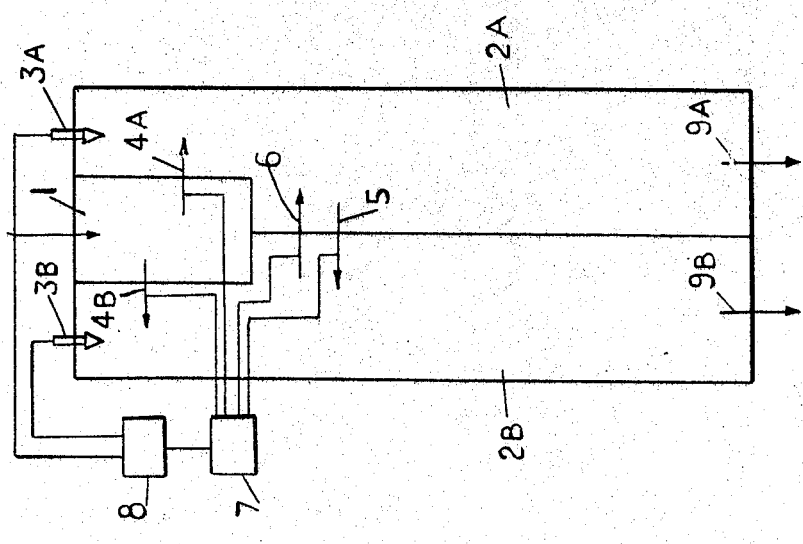

United States Patent Office 3,524,547
Patented Aug. 18, 1970

3,524,547
APPARATUS FOR THE TREATMENT OF SEWAGE AND LIKE INDUSTRIAL WASTE
James B. Nicol, Glasgow, Scotland, assignor to Drysdale & Company Limited, Glasgow, Scotland, a corporation of the United Kingdom of Great Britain and Northern Ireland
Filed Jan. 27, 1969, Ser. No. 793,999
Claims priority, application Great Britain, Jan. 25, 1968, 3,904/68
Int. Cl. V02c 5/04
U.S. Cl. 210—134                        6 Claims

ABSTRACT OF THE DISCLOSURE

A sewage treatment plant having a receiving compartment and two treatment compartments and means for admitting air beneath the normal liquid level of fluid in the compartment. Transfer means to transfer fluid between the three compartments. A fluid transfer control operates in four stages involving various arrangements of fluid transfer between the three tanks. Air introduction control means operates in two stages involving introduction of air to certain tanks at certain times, which times are related to the said fluid transfer stages.

---

Figure 4:
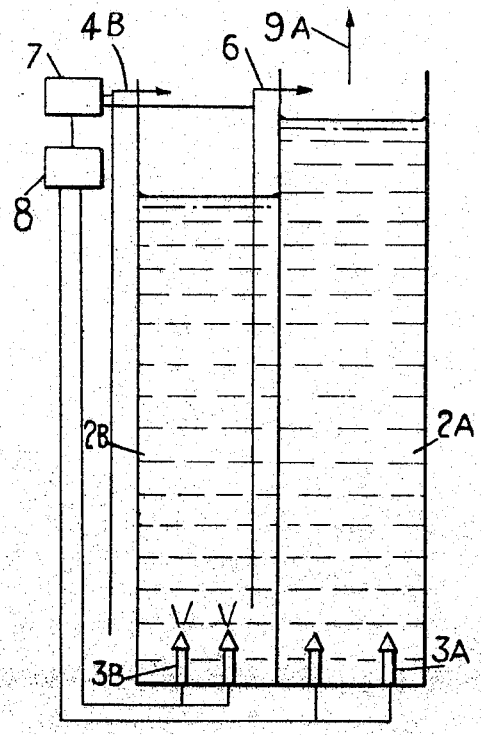

This invention relates to sewage treatment plants and particularly to sewage treatment plants intended to employ the extended aeration process of sewage treatment. Sewage treatment plants operating on the extended aeration process are already known. Such plants consist of a sewage-receiving and aerating compartment and a settling compartment arranged to receive treated sewage from the receiving and aeration compartment, means for introducing air to the sewage-receiving and aeration compartment and means for drawing off treated effluent from the surface of the settling compartment.

The known forms of extended aeration plants are continuous plants, i.e., in each plant all the time sewage is entering the plant a more or less constant quantity of effluent is flowing out of the plant through the effluent output. Because of the continuous flow through the plant the plant is rather sensitive to any change in the conditions prevailing in any part of the plant since the effect of any such change is rapidly communicated throughout the plant. It is an object of the present invention to provide an extended aeration sewage treatment plant which makes it possible to provide a greater degree of stability in operation in that any change in the working conditions in any part of the plant does not affect the working conditions in another part of the plant or affects them to a minor degree only.

A sewage treatment plant according to the invention incorporates three compartments, a sewage-receiving compartment and two treatment compartments, means in each treatment compartment for introducing air at a point below the normal liquid level in the compartment, fluid-transfer means having inlets and outlets so located that fluid may be transferred from the sewage-receiving compartment to each treatment compartment, fluid-transfer means so located that fluid may be transferred between the treatment compartments, the inlet of each of said fluid transfer means being at a level lower than that of the outlet, discharge means in each treatment compartment in the upper portion of the compartment for discharging treated sewage, fluid-transfer control means arranged to control operation of the fluid-transfer means to provide a recurring operating cycle consisting of four successive settings of the fluid-transfer means, a first in which the fluid-transfer means from the sewage-receiving compartment to one treatment compartment, and from said one treatment compartment to the other treatment compartment are both operative, a second in which only the fluid-transfer means from said other treatment compartment to said one treatment compartment is operative, a third in which the fluid-transfer means from the sewage-receiving compartment to said other treatment compartment and from said other treatment compartment to said one treatment compartment are both operative, and a fourth in which only the fluid-transfer means from said one treatment compartment to said other treatment compartment is operative, and air-introduction control means operatively interlinked with the fluid-transfer control means and arranged to control operation of the air-introducing means to provide a recurring operating cycle consisting of two successive settings of the air-introducing means, a first in which the means for introducing air into said one treatment compartment is operative during at least the terminal portion of said first setting of the fluid-transfer means and during at least the initial portion of said second setting of the fluid-transfer means, and a second in which the means for introducing air into said other treatment compartment is operative during at least the terminal portion of said third setting of the fluid-transfer means and during at least the initial portion of said fourth setting of the fluid-transfer means.

Conveniently, the plant may be arranged as a single tank with the sewage-receiving compartment at one end and the two treatment compartments side by side at the other end. This arrangement provides the minimum length of ducting associated with the various fluid-transfer means.

The means for transferring fluid from one compartment to another may be air lift means.

The fluid-transfer control means and the air-introduction control means may incorporate timing clocks set to operate according to a predetermined time programme. Alternatively they may incorporate means sensitive to the level of liquid in the respective compartments.

The discharge means from the treatment compartments may be weirs over which the treated sewage is free to flow when the level of the fluid reaches a predetermined height.

Figure 5:
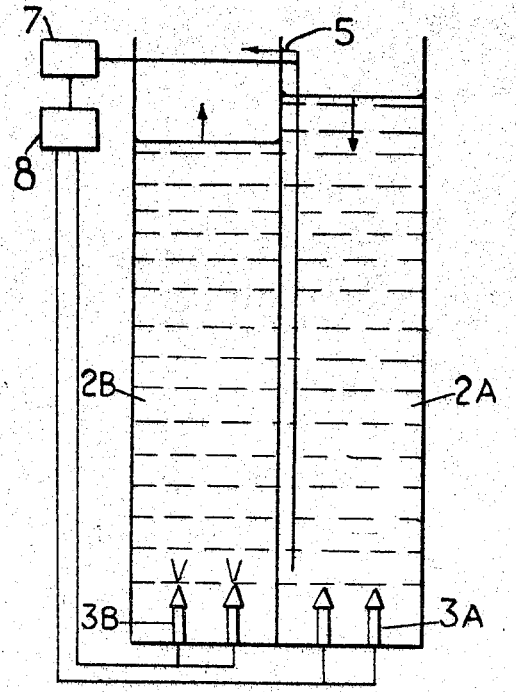

A practical embodiment of the invention is illustrated in the accompanying diagrammatic drawings in which FIG. 1 is a plan view of a sewage treatment plant and FIGS. 2, 3, 4 and 5 are elevations showing how the plant operates at different stages of the operating cycle.

In the drawings 1 denotes a sewage-receiving compartment, 2A and 2B denote two treatment compartments, 3A and 3B denote means for introducing air to the compartments 2A and 2B respectively at points below the normal liquid level in the compartments, 4A and 4B denote fluid-transfer means for transferring fluid from the sewage-receiving compartment 1 to the treatment compartments 2A and 2B respectively, the inlet of each fluid transfer means 4A or 4B being at a level lower than that of the outlet, 5 denotes fluid-transfer means for transferring fluid from the compartment 2A to the compartment 2B, and 6 denotes fluid-transfer means for transferring fluid from the compartment 2B to the compartment 2A, the inlet of each of the fluid-transfer means 5 or 6 being at a level lower than the of the outlet. 7 denotes fluid-transfer control means operative to control the operaion of the fluid transfer means 4A, 4B, 5 and 6. 8 denotes air-introduction control means operatively linked with the fluid-transfer control means 7 and arranged to control operation of the air-introducing means 3A and 3B. 9A and 9B denote fluid-discharge means for discharging fluid from the compartments 2A and 2B, respectively. It is to be noted that the fluid-transfer means 4A and 4B have been shown outside of the plant in FIGS. 2 and 4, respectively, for clarity of illustration. They actually are to be considered in these figures as dipping into the sewage-receiving compartment 1. Also for clarity of illustration in FIGS. 2 to 5 the fluid-transfer means not in operation at any particular stage are not illustrated.

In practice, sewage is continually introduced into the sewage-receiving compartment 1. The complete cycle of treatment in the plant consists of the following sequence of operations as illustrated successively in FIGS. 2 to 5, the performance of these operations being under the control of the fluid-transfer control means 7 and the air-introduction control means 8. The fluid-transfer means 4A from the sewage-receiving compartment 1 to the treatment compartment 2A and the fluid-transfer means 5 from said treatment compartment 2A to the other treatment compartment 2B are both rendered operative so that sewage is transferred from the sewage-receiving compartment 1 into the treatment compartment 2A and sewage from said treatment compartment 2A is also transferred from said treatment compartment 2A into the other treatment compartment 2B (see FIG. 2). Mixing takes place in the treatment compartment 2A. At the same time as this fluid-transfer is taking place or at least during the latter part of the time when this fluid transfer is taking place air is introduced into the treatment compartment 2A by the air-introducing means 3A and digestion of the sewage takes place. This action continues until the fluid level in the treatment compartment 2B reaches the level of the fluid-discharge means 9B. As settlement is taking place in the treatment compartment 2B all this time the liquid in the top layer is clear effluent and it is clear effluent which flows from the fluid-discharge means 9B. This operation continues for a predetermined period of time whereupon the two fluid-transfer means 4A and 5 at present operative are rendered inoperative and the fluid-transfer means 6 from the treatment compartment 2B to the treatment compartment 2A is set in operation. (See FIG. 3.) Fluid thereupon flows back from the treatment compartment 2B to the treatment compartment 2A so that the level falls in the treatment compartment 2B and rises in the treatment compartment 2A while air is still introduced into said one treatment compartment by the air-introducing means 3A at least during the initial portion of this part of the cycle. When the fluid level in the treatment compartment 2B has dropped to the desired extent or when the desired time has elasped the fluid-transfer means 4B from the sewage-receiving compartment 1 to the treatment compartment 2B becomes operative so that untreated sewage is now intrdouced into the treatment compartment 2B. (See FIG. 4.) The air supply to the treatment compartment 2A is either shut off now or has been shut off sometime previously and settling commences and the air introducing means 3B to the treatment compartment 2B is set in operation. Sewage is thus treated now in the treatment compartment 2B and the partly treated sewage in this compartment is mixed with the incoming untreated sewage from the sewage-receiving compartment 1 and the treatment continued. The continual flow of fluid from the treatment compartment 2B to the treatment compartment 2A causes the level in the treatment compartment 2A to rise while settling is taking place in the treatment compartment 2A and when the level becomes high enough the top layer of completely treated sewage flows out through the fluid-discharge means 9A as fully treated effluent. The two fluid-transfer means 4B and 6 at present operative continue operating either for a predetermined length of time or until the liquid level in the treatment compartment 2B falls to a predetermined level whereupon they are rendered inoperative and the fluid-transfer means 5 from the treatment compartment 2A to the treatment compartment 2B is set in operation while the air supply to the treatment compartment 2B is mainained at least during the initial operation of this part of the cycle. (See FIG. 5.) This completes the cycle of operations and the next action is that after a predetermined period of time or when the levels have reached predetermined heights the fluid-transfer means 4A from the sewage-receiving compartment 1 to the treatment compartment 2A is rendered operative and the fluid-transfer means 5 from the treatment compartment 2A to the treatment compartment being already operative the cycle is repeated.

The plant according to the present invention receives sewage continuously and discharges treated effluent more or less continuously alternately from the two treatment compartments. Nevertheless the plant operates as a batch process so that each part of the process is effectively separated from the other parts of the process thus permitting conditions to be varied in one part of the plant without effecting to any appreciable extent the conditions in any other part of the plant.

What is claimed is:

1. A sewage treatment plant incorporating three compartments, a sewage-receiving compartment and two treatment compartments, means in each treatment compartment for introducing air at a point below the normal liquid level in the compartment, fluid-transfer means having inlets and outlets so located that fluid may be transferred from the sewage-receiving compartment to each treatment compartment, fluid-transfer means so located that fluid may be transferred between the treatment compartments, the inlet of each of said fluid-transfer means being at a level lower than that of the outlet, discharge means in each treatment compartment in the upper portion of the compartment for discharging treated sewage, fluid-transfer control means arranged to control operation of the fluid-transfer means to provide a recurring operating cycle consisting of four successive settings of the fluid-transfer means, a first in which the fluid-transfer means from the sewage-receiving compartment to one treatment compartment, and from said one treatment compartment to the other treatment compartment are both operative, a second in which only the fluid-transfer means from said other treatment compartment to said one treatment compartment is operative, a third in which the fluid-transfer means from the sewage-receiving compartment to said other treatment compartment and from said other treatment compartment to said one treatment compartment are both operative, and a fourth in which only the fluid-transfer means from said one treatment compartment to said other treatment compartment is operative, and air-introduction control means operatively interlinked with the fluid-transfer control means and arranged to control operation of the air-introducing means to provide a recurring operating cycle consisting of two successive settings of the air-introducing means, a first in which the means for introducing air into said one treatment compartment is operative during at least the terminal portion of said first setting of the fluid-transfer means and during at least the initial portion of said second setting of the fluid-transfer means, and a second in which the means for introducing air into said other treatment compartment is operative during at least the terminal portion of said third setting of the fluid-transfer means and during at least the initial portion of said fourth setting of the fluid-transfer means.

2. A plant as claimed in claim 1 arranged as a single tank with the sewage-receiving compartment at one end and the two treatment compartments side by side at the other end.

3. A plant as claimed in claim 1 in which the means for transferring fluid between compartments are air lift means.

4. A plant as claimed in claim 1 in which the fluid-transfer control means incorporates timing means set to operate according to a predetermined time programme whereby to control operation of the fluid transfer means and the air introduction control means.

5. A plant as claimed in claim 1 in which the fluid-transfer control means incorporates means sensitive to the level of liquid in the respective compartments and operable to control operation of the fluid-transfer means and the air-introduction control means.

6. A plant as claimed in claim 1 in which the discharge means from the treatment compartments are weirs over which the treated sewage is free to flow when the level of the fluid reaches a predetermined height.

References Cited
UNITED STATES PATENTS

| | | | |
|---|---|---|---|
| 2,144,386 | 1/1939 | Nordell | 210—139 |
| 2,154,132 | 4/1939 | Mallory | 210—134 X |
| 2,243,826 | 5/1941 | Nielsen et al. | 210—139 X |
| 3,342,727 | 9/1967 | Bringle | 210—220 X |
| 3,355,019 | 11/1967 | Mitchell | 210—139 X |
| 3,382,981 | 5/1968 | Hampton | 210—220 X |

JAMES L. DE CESARE, Primary Examiner

U.S. Cl. X.R.

210—139, 220, 195